Nov. 22, 1938.   H. M. JONES   2,137,773
MEASURING APPARATUS
Filed Jan. 10, 1938
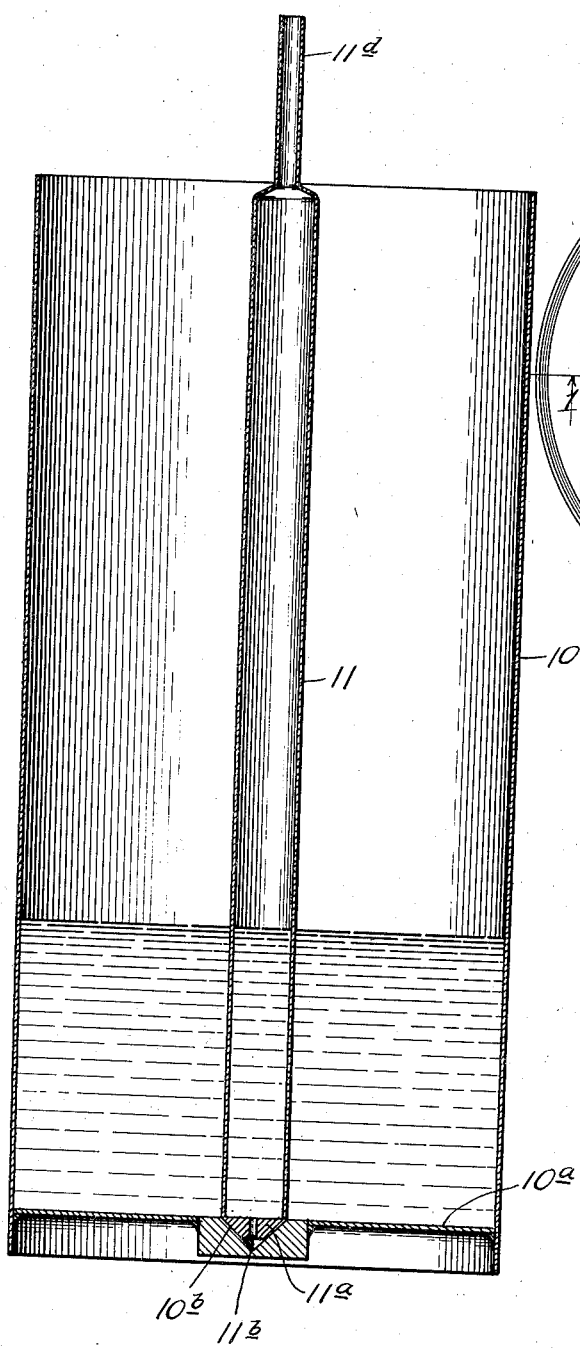
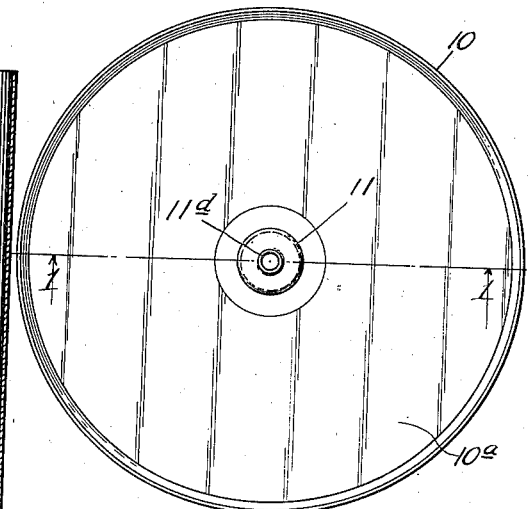
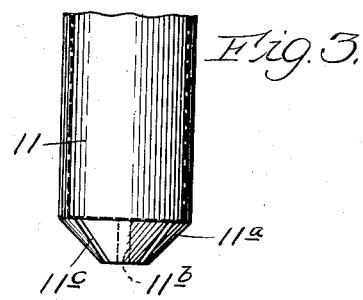
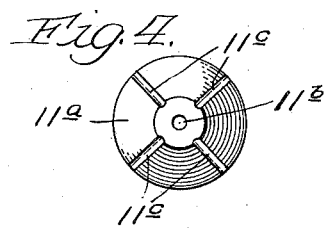
Inventor:
Harry M. Jones,
By Chritton, Wiles, Davies, Hirsch & Dawson,
Attys.

Patented Nov. 22, 1938

2,137,773

UNITED STATES PATENT OFFICE 2,137,773

MEASURING APPARATUS

Horry M. Jones, Chicago, Ill.

Application January 10, 1938, Serial No. 184,342

2 Claims. (Cl. 73—21)

This invention relates to improvements in measuring apparatus and more especially such apparatus adapted for easily and quickly measuring a predetermined fractional amount of any quantity of liquid in the apparatus.

In determining the rate of nitrogen consumption in the study of metabolism, for example, it is frequently desirable to retain the entire urine output from a patient for a given period, say, seventy-two hours, and then separate a predetermined fractional part, say $\frac{1}{72}$, therefrom. This can be accurately and quickly done by the practice of the invention.

Other features and advantages of the invention will appear more fully in the specification.

In that form of device embodying the features of the invention shown in the accompanying drawing—

Fig. 1 is a vertical sectional view; Fig. 2 is a top plan view; Fig. 3 is an enlarged view in side elevation of the lower end of the pipette; and Fig. 4 is a bottom plan view of the same.

As shown in the drawing, the apparatus includes a straight walled container 10 with a flat bottom 10a provided with a sump 10b in the form of an inverted cone. The container is here shown as substantially cylindrical. 11 indicates a pipette or tube with a solid portion or plug 11a at the lower end, of a size and shape substantially to fill the sump 10b. The plug 11a is provided with a small central bore 11b and its outer surface has four small channels 11c to permit flow of liquid therethrough from the container 10 to the bore 11b and thence into the pipette when the plug is in place in the sump.

The upper end of the pipette 11 is provided with a small pipe 11d adapted to be closed by the finger before the pipette is withdrawn from the container so that a column of liquid will be retained in the pipette by air pressure and surface tension over the lower end of the liquid in the small bore 11b.

Any desired proportions may be employed. For example, the container 10 may be from fourteen to sixteen inches high and have a diameter, the square of which is seventy-two times the square of the internal diameter of the pipette 11. For example, the internal diameter of the pipette 11 may be 1" and the internal diameter of the container. When retained in the pipette by air pressure and surface place the plug 11a substantially fills the sump 10b, its upper surface being level with the bottom 10a of the container. The column of liquid standing in the pipette will, therefore, be substantially $\frac{1}{72}$ of the volume of the entire contents of the container. This column is trapped in the pipette by closing the upper end with the finger, the pipette removed and the column discharged in a separate container.

There will be some error due to the quantity of liquid in the channels 11c and the bore 11b, and also some error due to the thickness of the wall of the pipette and escape of liquid therefrom because of the weight of the column. Correction for these errors may be made in any suitable manner. It has been found by test that substantial accuracy is obtained by enlarging the diameter of the container 10 slightly from bottom to top. For example, it may be substantially $\frac{1}{4}''$ larger at the top and taper inwardly to the bottom.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible in view of the prior art.

What I claim as new, and desire to secure by Letters Patent, is:

1. Measuring apparatus, including: a substantially straight walled container with a flat bottom having a sump therein; a pipette having a plug at the bottom adapted substantially to fill said sump; and means whereby liquid will flow from the container into the pipette when the plug is in place in the sump; whereby a predetermined fractional amount of any quantity of liquid in the container may be withdrawn in the pipette.

2. Measuring apparatus, including: a substantially straight walled container with a flat bottom having a sump therein; and a pipette having a plug at the bottom adapted substantially to fill said sump, said plug having a small bore therethrough and a channel on the outer surface thereof communicating with the bore to permit flow of liquid from the container into the pipette when the plug is in place in the sump; whereby a predetermined fractional amount of any quantity of liquid in the container may be withdrawn in the pipette.

HORRY M. JONES.